United States Patent [19]

Nakamura

[11] 4,305,061
[45] Dec. 8, 1981

[54] ELECTRICAL FILTER AND SIGNAL DISCRIMINATING APPARATUS EMPLOYING THE SAME

[75] Inventor: Takeshi Nakamura, Uji, Japan

[73] Assignee: Murata Manufacturing Co., Ltd., Japan

[21] Appl. No.: 46,154

[22] Filed: Jun. 6, 1979

[30] Foreign Application Priority Data

Jun. 14, 1978 [JP] Japan ................... 53-72646

[51] Int. Cl.³ .................. H03D 1/00; H04Q 9/00
[52] U.S. Cl. .................. 340/825.71; 329/117; 328/149
[58] Field of Search ............ 340/171 R; 343/228; 328/149, 167; 361/182, 185, 183; 329/117, 118

[56] References Cited
U.S. PATENT DOCUMENTS

| 3,076,939 | 2/1963 | Wycoff | 328/149 |
| 3,371,316 | 2/1968 | Johnson | 343/228 |
| 3,648,184 | 3/1972 | Fujishima et al. | 329/117 |
| 3,761,819 | 9/1973 | Fukata | 343/228 |
| 3,911,367 | 10/1975 | Saito et al. | 343/228 |
| 4,013,970 | 3/1977 | Nagata et al. | 329/117 |

Primary Examiner—Donald J. Yusko
Attorney, Agent, or Firm—Ostrolenk, Faber, Gerb & Soffen

[57] ABSTRACT

The disclosure relates to an improved signal discriminating apparatus which includes an electrical filter having as a central frequency, a value between the frequencies of two signals different from each other in frequency the presence or absence of each of which in a carrier signal is to be detected, circuitry for discriminating whether at least one of the two signals different from each other in frequency and is present in the carrier signal, and further circuitry for discriminating the phase difference between the input and the output sides of the filter.

10 Claims, 3 Drawing Figures

ELECTRICAL FILTER AND SIGNAL DISCRIMINATING APPARATUS EMPLOYING THE SAME

BACKGROUND OF THE INVENTION

The present invention relates to an electrical filter and a signal discriminating apparatus employing the electrical filter for discriminating two signals having frequencies different from each other.

Commonly, in electrical and electronic systems, there are cases where it is required to discriminate whether either of two signals having frequencies different from each other is present or neither of these two signals is present.

In the sound multiplex system in the television broadcasting, for example, when a stand-in voice reproducing device is to be operated, a signal of 922.5 Hz as a control signal is placed upon the carrier signal of 55.125 MHz. Meanwhile, when a stereo-broadcast reproducing device is to be operated, a signal of 982.5 Hz in frequency as a control signal may be placed upon said carrier signal.

Conventionally, as shown in FIG. 1, a piezo-electric tuning fork 2 with a central frequency of 922.5 Hz and a piezo-electric tuning fork 3 with a central frequency of 982.5 Hz are connected in parallel to the output side of the amplifier 1 to amplify the output of the tuning fork 2 by a amplifier 4 thereby to operate a relay 5, while the output of the tuning fork 3 is amplified by an amplifier 6 to operate a relay 7. Accordingly, when neither the signal of 922.5 Hz nor the signal of 982.5 Hz is placed on the carrier signal, neither the relay 5 nor the relay 7 operates. Thus, neither the stand-in voice reproducing device 8 nor the stereo-broadcast reproducing device 9 operates. When the signal of 922.5 Hz is placed upon the carrier signal, output is developed only at the output side of the tuning fork 2 to operate the relay 5, whereby the stand-in voice reproducing device 8 functions. On the other hand, when the signal of 982.5 Hz is placed upon the carrier signal, output is produced only at the output side of the tuning fork 3 to operate the relay 7, whereby the stereo-broadcast reproducing device 9 functions.

In the known arrangement as described hereinabove, tuning forks equal in number to the control signals are required, thus resulting in high cost. Furthermore, since the control signals are close to each other in frequency, separating means having superior selectivity, for example, piezo-electric tuning forks and the like, are required instead of inexpensive LC filters, thus making it difficult to reduce the manufacturing cost. For developing any new systems for wide application as well as for said sound multiplex system described above, it is indispensably required to provide necessary apparatuses at low cost as far as possible from manufacturing point of view.

Additionally, in the conventional arrangement as described in the foregoing, signal level of the central frequency of the tuning fork 2 or 3 is important. More specifically, even when signals of the central frequencies of the respective tuning forks 2 and 3 are present, the relays 5 and 7 are not actuated if these signals are below predetermined levels, while sufficient amplification of the signals may result in malfunctions of the relays 5 and 7 due to internal and external noise, etc. Moreover, it is required to employ filters which are superior in selectivity due to proximity in frequency of the two signals, but extremely high selectivity tends to give rise to variations in characteristics of the filter, e.g., the temperature characteristics thereof, due to fluctuation in the external circumstances of the filter, countermeasures against which are difficult.

SUMMARY OF THE INVENTION

Accordingly, an essential object of the present invention is to provide an improved signal discriminating apparatus which is capable of efficiently discriminating two signals having frequencies different from each other, for example, for use in sound multiplex system for television broadcasting, etc., and an electrical filter to be employed for such signal discriminating apparatus.

Another important object of the present invention is to provide an improved signal discriminating apparatus and an electrical filter to be employed therefor as described above which are free from malfunctions due to external varying factors such as signal level, internal and external noises, temperatures, etc. for stable and efficient functioning.

A further object of the present invention is to provide an improved signal discriminating apparatus and an electrical filter to be employed therefor of the above described type which are simple in construction and stable in functioning, and can be manufactured at low cost.

In accomplishing these and other objects, according to one preferred embodiment of the present invention, there is provided an improved signal discriminating apparatus which is arranged to discriminate whether or not both of two signals exist or which one of the two signals exists and which employs a filter having a value between the two signals as its central frequency. The apparatus determines whether the signal phase difference between the input and output of the filter is the same or opposite in phase thereby to make the respective existences of the two signals correspond to the signal phase difference between the input and output of the filter.

More specifically, the signal discriminating apparatus of the present invention generally includes: an electrical filter having as its central frequency, a value between the frequencies of two signals different from each other in frequency and which are to be discriminated; circuit means for discriminating whether at least one of two signals are present; and another circuit means for determining phase difference between the input and output sides of said filter.

By the arrangement according to the present invention as described above, an improved signal discriminating apparatus capable of efficiently discriminating two signals having frequencies different from each other and free from malfunctions due to external factors has been advantageously presented with substantial elimination of disadvantages inherent in the conventional apparatuses of the kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout views of the attached drawings.

DETAILED DESCRIPTION OF THE INVENTION

Figure 1:
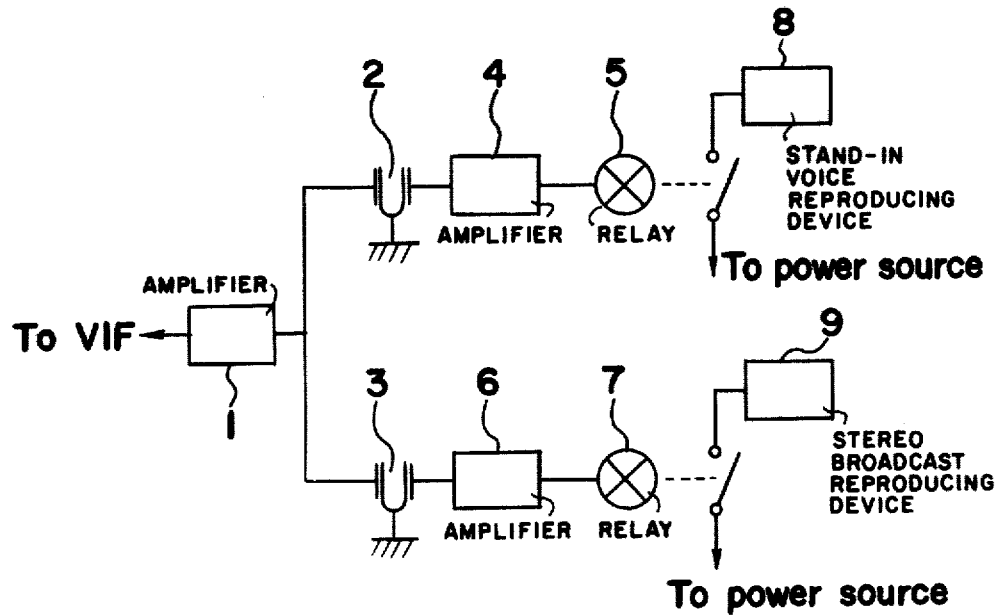
FIG. 1 is an electrical block diagram showing the circuit arrangement of a conventional signal discriminating apparatus (already referred to)
Figure 2:
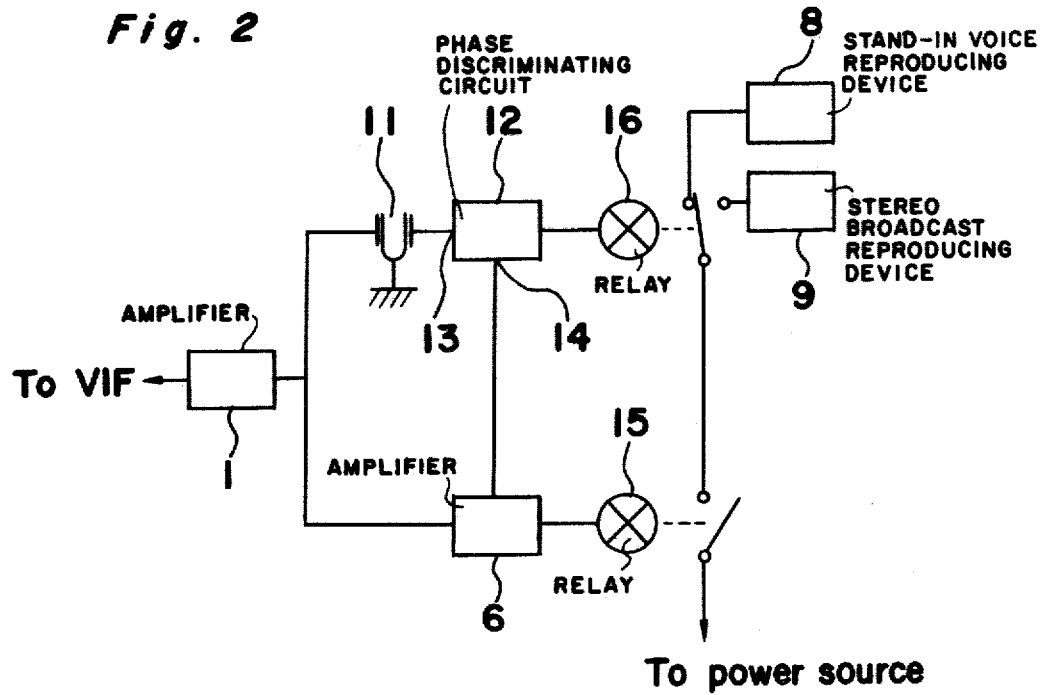
FIG. 2 is an electrical block diagram showing the circuit arrangement of a signal discriminating apparatus accoridng to one preferred embodiment of the present invention.

Referring now to the drawings, there is shown in FIG. 2 the circuit construction of an improved signal discriminating apparatus according to one preferred embodiment of the present invention.

In the arrangement of FIG. 2, the output terminal of the amplifier 1 is coupled through a filter 11 to the input terminal 13 of a phase discriminator 12 whose output is coupled to a relay 16, while contacts of the relay 16 are selectively connected, for example, to the stand-in voice reproducing device 8 and stereo-broadcast reproducing device 9 for change-over therebetween and also to a power source through contacts of a relay 15. The output terminal of the amplifier 1 is also coupled to the relay 15 through the amplifier 6 which is also connected to another input terminal 14 of the phase discriminator 12. The filter 11 may be a piezo-electric tuning fork, an LC filter or the like, but should preferably be an inexpensive one, since high sensitivity thereof is not particularly required in the above arrangement. The central frequency of the filter 11 is set to be either, $(922.5 \text{ Hz} + 982.5 \text{ Hz}) \div 2 = 952.5$ Hz or $\sqrt{922.5 \text{ Hz} \times 982.5 \text{ Hz}} \approx 952.0$ Hz. The phase discrminating circuit 12 may be of the type which which develops an output when the phase difference between the signals applied to its two input terminals 13 and 14 is, for example, 0° and which does not generate an output when said phase difference is 180°. Alternatively, the phase discriminating circuit 12 may be of the type which develops an output when the phase difference between signals applied to its two input terminals 13 and 14 is, for example, 180° and which does not develop an output when the phase difference is 0°. Any known phase discriminating circuits may be employed. The relay 15 is arranged to be energized or de-energized according to the presence or absence of an output from the amplifier 6, while the relay 16 is adapted to be changed over at the contacts thereof depending on the presence or absence of an output of the phase discrminating circuit 12. The power supply is arranged to be applied only to either the stand-in voice reproducing device 8 or stereo-broadcast reproducing device 9 through the contacts of the relay 16. For example, when the relay 16 is not driven through the output of the phase discrminating circuit 12, the power supply is applied to the stand-in voice reproducing device 8, and if the relay 16 is driven through the output of the phase discrminating circuit 12, the power supply is directed to the stereo-broadcast reproducing device 9, with the power supply being coupled through the contacts of the relay 15 to the contacts of the relay 16. Accordingly, the stand-in voice reproducing device 8 or the stereo-broadcast reproducing device 9 is allowed to function only when the contacts of the relay 15 are turned on. The output of the amplifier 1 is applied to the input terminal 13 of the phase discriminating circuit 12 through the filter 11 and is also impressed to the input terminal 14 of the phase discriminating circuit 12 through the amplifier 6. The phase of a signal to be applied to the input terminal 14 is arranged to be the same as that at the input side of the filter 11.

Figure 3:
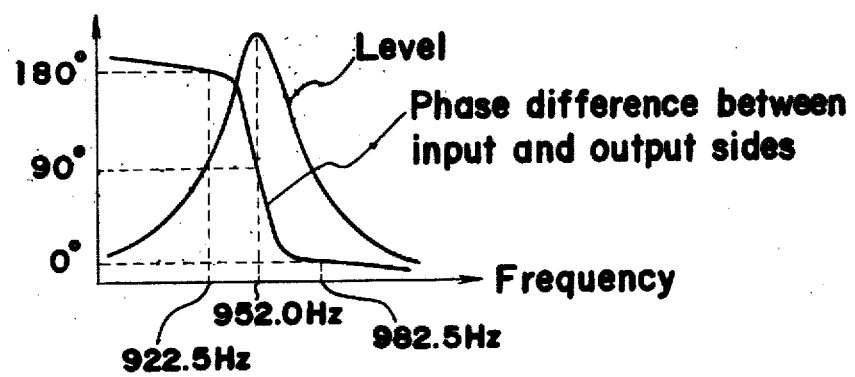
FIG. 3 is a graph explanatory of the characteristics of a filter employed in the arrangement of FIG. 2.

The operation of the circuit of FIG. 2 will now be described. When neither the signal of 922.5 Hz nor the signal of 982.5 Hz is placed on the carrier signal, neither the stand-in voice reproducing device 8 nor the stereo-broadcast reproducing device 9 is operated, irrespective of the condition of the contacts of the relay 16, since the relay 15 is in its off position. When only the signal of the 922.5 Hz is placed on the carrier signal, a signal having a phase difference of 180° as compared with the input side of the filter 11 is applied to the input terminal 13 of the phase discriminating circuit 12 and a signal which is the same in phase as that at the input side of the filter 11 is applied to the input terminal 14 of the phase discriminating circuit 12 if the phase difference between the input and output sides of the filter 11 is 180° as shown in FIG. 3. Accordingly, the phase difference between the signals applied respectively to the input terminals 13 and 14 becomes 180°, and since no output is developed at the output side of the phase discriminating circuit 12, the contacts of the relay 16 remain the same as shown in FIG. 2. On the other hand, since the signal of 922.5 Hz exists, the contacts of the relay 15 are switched on. Accordingly, when the signal of 922.5 Hz is placed on the carrier signal, only the stand-in voice reproducing device 8 operates. On the assumption that the phase difference between the input and output sides of the filter 11 is 0° as shown in FIG. 3 when only the signal of 982.5 Hz is placed on the carrier signal, the signal which is the same in phase as that at the input side of the filter 11 is applied to the input terminal 13 of the phase discriminating circuit 12 and the signal which is the same in phase as that at the input side of the filter 11 is also applied to the input terminal 14 of the phase discriminating circuit 12. Accordingly, the phase difference between the signals applied respectively to the input terminals 13 and 14 becomes 0° to cause output to be developed at the output side of the phase discriminating circuit 12, with the result that the contacts of the relay 16 are reversed from the condition as shown in FIG. 2. On the other hand, as the signal of 982.5 Hz exists, the contacts of the relay 15 are turned on. Thus, when the signal of 982.5 Hz is placed upon the carrier signal, only the stereo-broadcast reproducing device 9 operates.

Needless to say, in the actual apparatus, there may be employed a filter which is capable of providing minimum phase difference to such an extent as will be sufficient to discriminate which is the signal applied upon the apparatus, since some allowance is available even if the phase is not made exactly the same or opposite literally, while the phase discriminating circuit 12 may be of such accuracy that it is capable of discriminating whether signals applied to the two input terminals are the same or opposite in phase. Therefore, the central frequency of the filter is not required to be exactly half way between the two signals. In other words, there may be employed a filter which has a central frequency showing an intermediate value of the phase difference value between the input and output shown respectively by the two signals applied. It should be noted here that the present invention is not restricted to the foregoing embodiment, but, for example, signal may be directly applied from the input side of the filter 11 to the input terminal 14 of the phase discriminating circuit 12, and that the input to the amplifier 6 may be modified to be applied through the filter 11.

As is clear from the foregoing description, according to the present invention, only one filter is employed to discriminate a plurality of conditions, i.e., to discriminate conditions in which two signals each being different in frequency do not exist or to find which signal exists when only one of the two signals exists, and thus, the cost required for at least one filter can be eliminated. Even if two signals are close to each other, for example, a piezo-electric tuning fork having superior selectivity is not particularly required, and therefore, the one filter to be employed may be an inexpensive one such as an LC filter, with consequent reduction of cost from this point of view. Furthermore, in the conventional arrangements of the kind, since piezo-electric tuning forks providing high selectivity must be normally employed from the characteristic aspect due to proximity of the two signals in frequency, it has been required to design the discriminating apparatuses by taking into account the temperature characteristics and measures against prevention of malfunctions due to specific noises, etc., but according to the present invention as described in the foregoing, such considerations are made completely unnecessary.

Although the present invention has been fully described by way of example with reference to the accompanying drawings, it is to be noted that various changes and modifications are apparent to those skilled in the art. The scope of the invention, therefore, is to be limited not by the details of the specific embodiments described herein, but only by the terms of the appended claims.

What is claimed is:

1. A signal discriminating apparatus for determining if the frequency of a signal received thereby has either a first or a second value, said apparatus comprising:

a filter;

means for applying said received signal to said filter;

said filter having a central frequency lying between said first and second values, said central frequency being chosen such that when said frequency of said received signal is equal to said first value, said filter will cause a phase shift in said received signal of more than a predetermined value and such that when said frequency of said received signal is equal to said second value, said filter will cause a phase shift in said received signal of less than said predetermined value;

first determining means for determining whether the phase difference between said received and said phase shifted signal appearing at an output of said filter is greater than said predetermined value, said first determining means producing an output having one value when said phase difference is approximately zero degrees and producing an output having a second, different value when said phase difference is approximately 180 degrees;

should determining means for determining whether a signal is being received by said apparatus; and means for actuating a first or a second external device responsive to the detection of the presence of a signal whose frequency has said first or said second value, respectively.

2. A signal-discriminating apparatus as claimed in claim 1, wherein said first and second external devices are a voice-reproducing device and a stereo-broadcast reproducing device, respectively, for use in a television receiver.

3. A signal discriminating apparatus as claimed in claim 1, wherein said filter is a piezo-electric tuning fork.

4. A signal discriminating apparatus as claimed in claim 1, wherein said filter is an LC filter.

5. A signal discriminating apparatus as claimed in claim 1, wherein said filter has a central frequency equivalent to half of a value obtained by adding frequency values of said two signals.

6. A signal discriminating apparatus as claimed in claim 1, wherein said filter has a central frequency equivalent to the square root of the value obtained by multiplication of the respective frequency values of said two signals.

7. A signal-discriminating apparatus as claimed in claim 1, wherein said actuating means comprises first and second relays.

8. A signal-discriminating apparatus as claimed in claim 7, wherein said first relay has a first state for providing electrical power to one of said external devices and has a second state for cutting off electrical power to both of said external devices, said second determining means causing said first relay to operate in said first state when a signal is being received by said apparatus.

9. A signal-discriminating apparatus as claimed in claim 8, wherein said second relay has first and second states for supplying electrical power to said first and second external devices, respectively, when said first relay is in its said first state.

10. A signal-discriminating apparatus as claimed in claim 9, wherein said first determining means causes said second relay to operate in its said first state or in its said second state when said apparatus is receiving a signal whose frequency has said first or said second value, respectively.

* * * * *